July 26, 1955
C. L. TAPPER
2,713,943
ELECTRIC CORD TESTING DEVICE
Filed Nov. 9, 1951
2 Sheets-Sheet 1
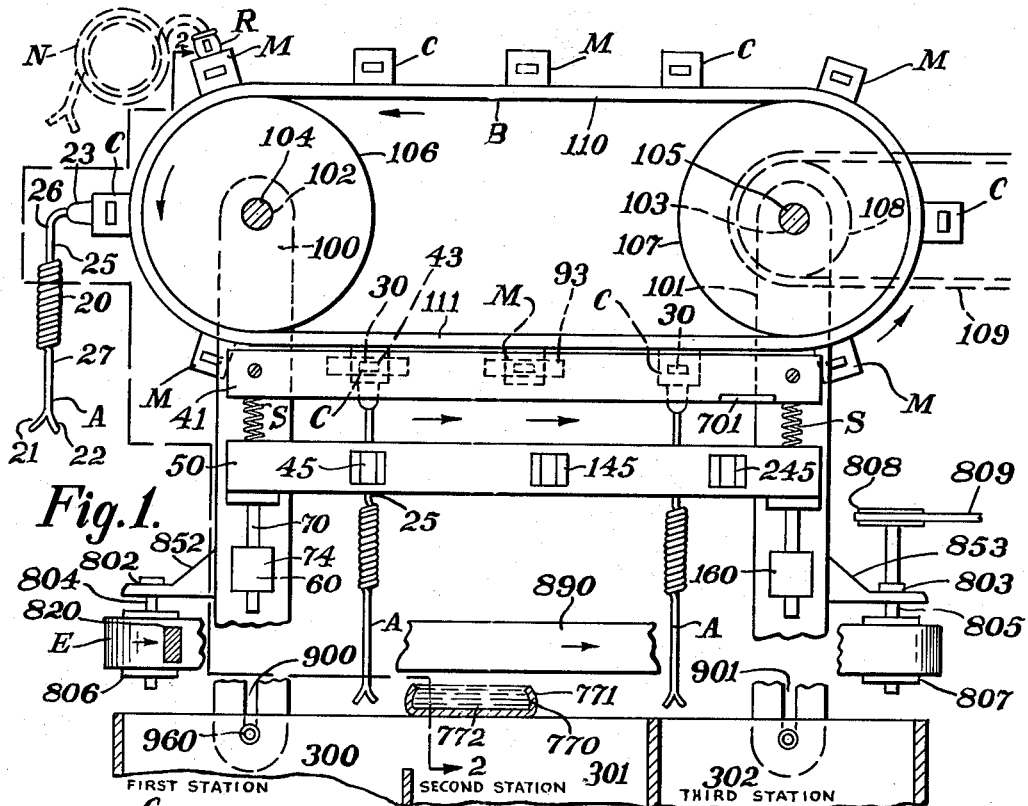
*Fig. 1.*
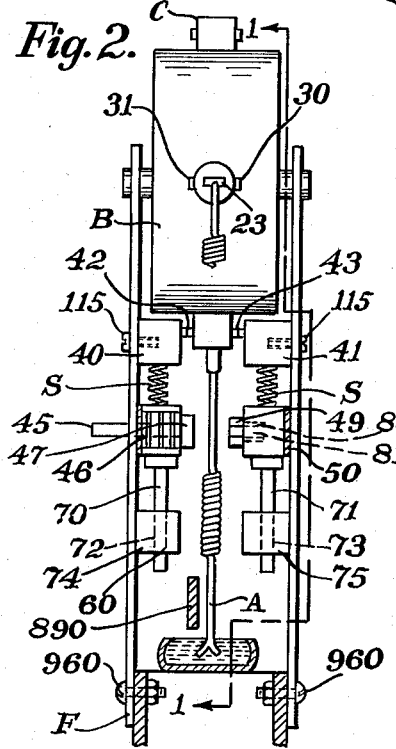
*Fig. 2.*
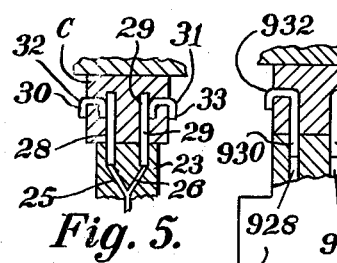
*Fig. 3.*
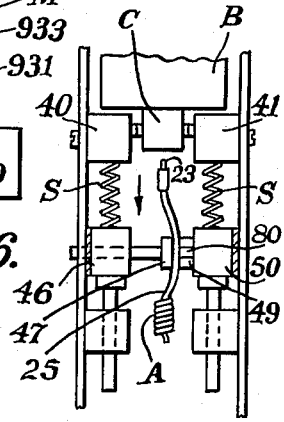
*Fig. 5.*
*Fig. 6.*
*Fig. 4.*
INVENTOR.
CARL L. TAPPER
BY
Pearson + Pearson
ATTORNEYS July 26, 1955  C. L. TAPPER  2,713,943
ELECTRIC CORD TESTING DEVICE
Filed Nov. 9, 1951   2 Sheets-Sheet 2

INVENTOR.
CARL L. TAPPER
BY
Pearson + Pearson
ATTORNEYS

United States Patent Office 2,713,943
Patented July 26, 1955

2,713,943

ELECTRIC CORD TESTING DEVICE

Carl L. Tapper, Lowell, Mass.

Application November 9, 1951, Serial No. 255,562

13 Claims. (Cl. 209—81)

This invention relates to an automatic testing device for hanks or coils of electric wire. It is especially adaptable for lengths of two-strand insulated wire, up to about one hundred feet, having a slidable connecting element such as an electric plug or receptacle attached to one set of adjacent wire terminals and having the other set of adjacent wire terminals free of any attachment or provided with a plug or receptacle. Such lengths of wire, constitute an article of manufacture and are sold to manufacturers of electric appliances for attachment to various kinds of electric devices.

Heretofore it has been customary to manually test each cord, prior to shipment, by separate and time consuming tests to determine whether or not there is a short circuit in the cord or whether or not there is an open, or incomplete circuit therein. An operator has had the task of grasping each hanked cord, placing the plug or receptacle at one end thereof in a suitable electric connector and observing whether it is short circuited. If not short circuited, the next task of the operator has been the crossing of the free terminals or the crossing of any electric connector at the opposite end of the wire and observing whether or not the cord properly conducts current throughout its length.

I use the terms "strand," "wire strand" and "stranded conductors" to mean one of the electric conductors of an electric cord whether that conductor is formed of a single wire or of multiple wires.

The principal object of my invention is to provide completely automatic mechanism into which a plug or receptacle may be inserted and which not only automatically tests the circuit in each cord, but automatically extracts the satisfactory cords into one container, the short circuited cords into another container and the open circuited cords into still another container. Another object of my invention is to provide such an automatic testing device which will accommodate and test short straight cords, longer hanked cords or still longer coiled cords whether they have a plug or receptacle at either end or a plug at one end and free terminals at the opposite end.

Figure 7:
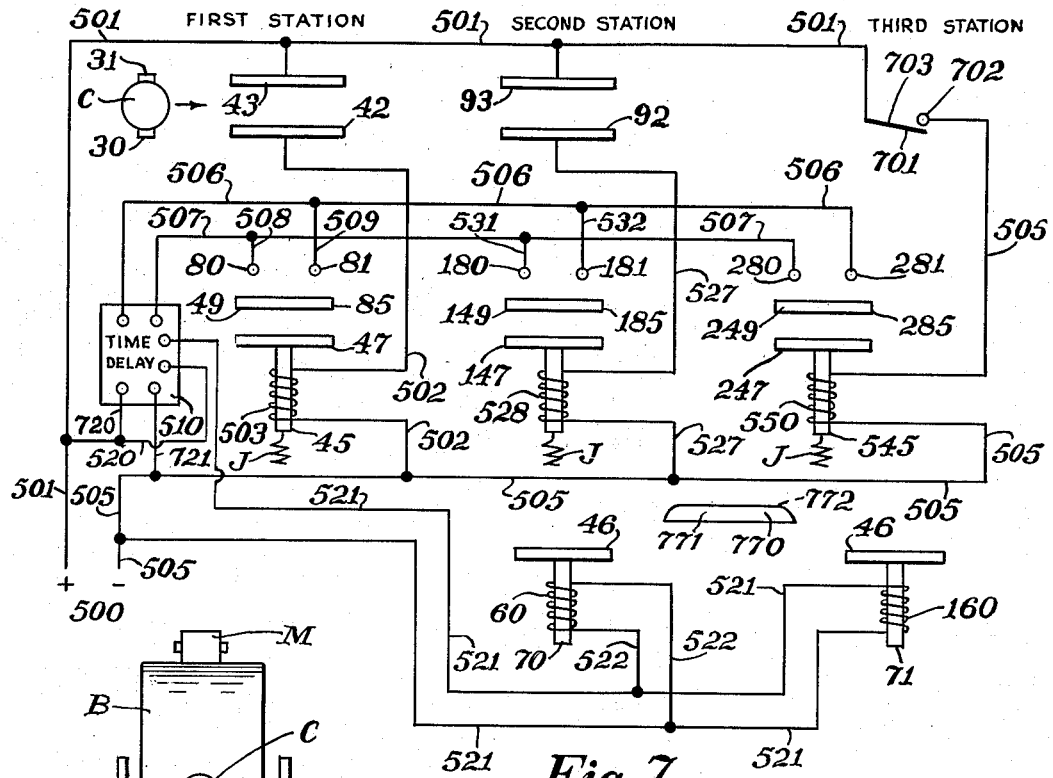
Figure 9:
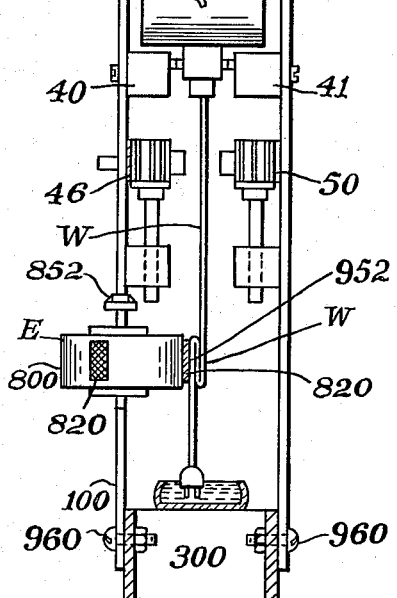
Figure 8:
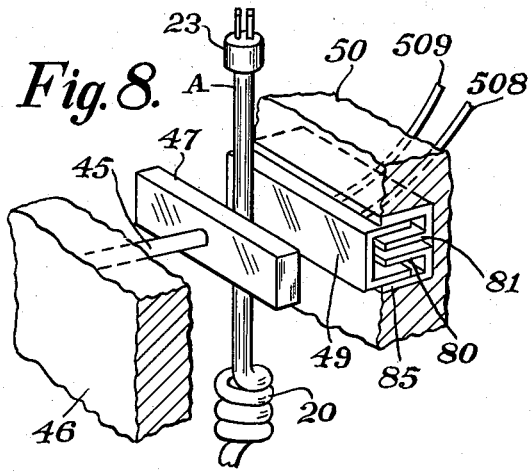

In the drawings, Fig. 1 is a side elevation of my invention in section, on line 1—1 of Fig. 2. Fig. 2 is an end elevation thereof in section on line 2—2 of Fig. 1. Fig. 3 is a fragmentary end elevation similar to Fig. 2, showing a cord being clamped by my device, Fig. 4 is a view similar to Fig. 3 showing a clamped cord being extracted by my device, Fig. 5 is an enlarged sectional view of one of the plug-receiving members of my device, Fig. 6 is an enlarged sectional view of one of the receptacle receiving members of my device. Fig. 7 is an electrical diagram of my invention, Fig. 8 is a fragmentary isometric view of my cord clamping mechanism, and Fig. 9 is a view similar to Fig. 2 showing my device in use with an unhanked or uncoiled cord.

As shown in the drawings, A is one type of electric cord having two strands of electric wire 25 and 26 covered with suitable insulation 27 and formed into a hank 20. An electric plug 23 is attached at one end of cord A, the plug 23 having a pair of prongs 28 and 29, each connected to a wire strand 25 or 26. The pair of free terminals 21 and 22 of wire strands 25 or 26, at the other terminal end of cord A, are usually and preferably stripped of insulation for a short distance in which case they are spread apart as shown, whereby the bare wire portions do not touch. However, my device will operate equally well if the free terminals 21 and 22 are not stripped of insulation as will be obvious hereinafter.

I provide a frame F, having oppositely disposed pairs of uprights 100, 100 and 101, 101 at each end, the upper portion of each upright being journaled at 102 or 103 for the shafts 104 and 105 of conveyor drums 106 or 107. A pulley 108 is mounted on the shaft 105 of a drum such as 107 and is operatively connected to a source of power, not shown, such as an electric motor, by a belt 109.

A first endless conveyor B, such as a belt or chain, is trained around drums 106 and 107 and a plurality of electric plug receiving members C and receptacle receiving members M are spaced alternately therearound, centrally of the outer periphery of the conveyor B. As shown in Fig. 5, each member C differs from the ordinary electric plug receptacle in that it contains strips 30 and 31 of electric conducting material so bent and shaped as to convey current from each plug prong 28 or 29 to an opposite point, such as strips 32 or 33, on the outer surface of member C.

As shown in Fig. 6, each member M differs from the ordinary electric plug in that it contains strips 930 and 931 of electric conducting material so bent and shaped as to convey current from each prong recess 928 and 929 of receptacle R to an opposite point, such as 932 or 933 on the outer surface of member M.

Cords A may be plugged in members C along the upper stretch 110 of conveyor B, or preferably at the point shown in Fig. 1 whereupon the conveyor carries the cords A along the lower stretch 111 of conveyor B for testing and disengagement.

Cords having a receptacle such as R, at one end, and a plug or open terminals at the opposite end, are slid onto each alternate member M and are automatically tested in the same manner as is described herein for cords A.

I provide a pair of elongated stationary supports 40 and 41, extending longitudinally below the lower stretch 111 of conveyor B and on opposite sides of the path of the members C and M carried by the conveyor. Supports 40 and 41 are fixed to the uprights 100 and 101 in any convenient manner such as by screws 115. Extending along the inner walls of supports 40 and 41 are a pair of oppositely disposed longitudinally extending electric conducting tracks 42 and 43 each positioned to slidably engage a contact strip 32 or 33 of each member C and a contact strip 932 or 933 of each member M as the members are carried therebetween by conveyor B. I call the zone between the opposite ends of tracks 42 and 43 the first station of my device, this being the station at which the cord is automatically tested for short circuits, and automatically disengaged if a short circuit is found to exist in the cord.

At a spaced distance along supports 40 and 41 I provide a similar pair of oppositely disposed, longitudinally extending, electric conducting tracks 92 and 93 also positioned to engage a contact strip 32 or 33 of each member C or a contact strip 932 or 933 of each member M as the member is carried therebetween by conveyor B. I call the zone between the opposite ends of tracks 92 and 93, the second station of my device, this being the station at which the cord is automatically tested for open circuits and automatically disengaged if the circuit through the cord is satisfactory.

Still further spaced along supports 40 and 41, I provide a movable contact arm 701, and a stationary contact point 702, which form a switch 703. Arm 701 is positioned in the path of a plug 23 of any cord such as A, or a receptacle R of another type cord that has failed to be disengaged from its member C or M as a result of tests at the first and second stations. I call the zone of the switch 703, the third station of my device, this being the station at which any cord with an open, or incomplete circuit, is automatically disengaged from its socket.

A pair of vertically movable elongated supports 46 and 50, are provided, each extending longitudinally below stationary supports 40 and 41 on opposite sides of the path of cords A, depending from members C or M on conveyor B.

Each movable support 46 and 50 is mounted on depending guide rods such as 70 and 71, the rods 70 and 71 being vertically slidable in holes 72, 73 in inwardly projecting members 74 and 75 of frame F. Coil springs S are provided to maintain movable supports 46 and 50 at a spaced position below stationary supports 40 and 41 and to return the movable supports to this position after they have been automatically pulled downwardly as explained hereinafter.

My cord clamping mechanism at the first station includes an electrically operated solenoid plunger 45 of a well known type, mounted to slide horizontally in support 46, and having a longitudinally extending clamping head or jaw 47 of substantially the same length as each track 42 and 43. Jaw 47 is located under tracks 42 and 43 in the plane of that portion of a cord such as A below plug 23 and above hank 20.

An elongated jaw 49 is mounted opposite to jaw 47 on movable support 50, whereby electrical actuation of solenoid plunger 45 causes head or jaw 47 to approach jaw 49 and grasp cord A between the jaws. Jaw 49 forms the contact arm of a microswitch 85 and closes a circuit through switch 85 each time jaw 47 advances and clamps a cord A against jaw 49 by connecting contact points 80 and 81.

The cord clamping mechanism at the second station is similar to that at the first station and includes a solenoid operated jaw 147, an opposite jaw 149 and a microswitch 185 having contact points 180 and 181. The cord clamping mechanism at the third station, is also similar to that at the first and second stations and includes a solenoid operated jaw 247, an opposite jaw 249, and a microswitch 285 having contact points 280 and 281.

The vertically movable supports 46 and 50 form my cord extracting mechanisms and operate only when a cord has been clamped between jaws such as 47, 49, 147, 149 or 247, 249. A solenoid coil 60 or 160 is mounted within inwardly projecting members 74 and 75 of frame F, each surrounding a vertical guide rod such as 70 and 71, and arranged to draw the rods and supports downwardly upon electrical impulse from any of the switches 85, 185 or 285. Two solenoids 60, 160 may be provided for one support only such as 46 as shown in the drawings, for both supports 46 and 50 if desired, or it is obvious that one solenoid could be arranged to lower both supports.

The lower portion of frame F is preferably divided into three bins 300, 301 and 302 and above the central bin 301 I provide an electric conducting medium of low resistance 770 such as an elongated, narrow trough 771 containing a shallow bath of an electric conducting liquid 772, or a flat metallic plate. Bin 300 is positioned at the first station under tracks 42 and 43 and under the clamping mechanism which forms switch 85 to receive cords found to have a short circuit. Bin 301 is positioned at the second station under tracks 92, 93 and under the clamping mechanism which forms switch 185 to receive cords found to be satisfactory. Bin 302 is positioned at the third station, under switch 702 and under the clamping mechanism which forms switch 285 to receive all cords found unsatisfactory by reason of an incomplete or open circuit therein.

As shown in Fig. 1, my device will accommodate hanked cords such as A having a plug at one end and open terminals at the opposite end. As indicated in dotted lines in Fig. 1, it will also accommodate cords such as N having a receptacle at one end and open terminals at the opposite end by connecting each receptacle to a member M. Cords A or N may obviously be either coiled or hanked and may have an electric plug at the opposite end instead of open terminals in which case the plug prongs are crossed at the second station by the electric conducting medium such as 770.

In the event that the hank or coil of a cord such as A or N is greater in size than usual, or in the event that an unhanked or uncoiled cord such as W is to be tested, the uprights 100 and 101 can be lifted above the bins 300, 301 and 302. I provide slots 900 and 901 in uprights 100 and 101, connected by bolts and nuts such as 960 to the bins, whereby the cord clamping mechanism and cord disengaging mechanism can be adjusted to the desired height over the bins and over the electric conducting medium such as 770. I also provide a second conveyor E, trained on drums 806 and 807 and preferably positioned below the movable supports 46 and 50 so that one stretch 890 thereof will parallel the path of cords hanging from conveyor B through the three stations of my device. Patches 820 of suitable adhesive such as "Elemi" are spaced around conveyor E and, as shown in Fig. 9, a lower portion 952 of a cord such as W can be stuck to the adhesive by the operator before it is carried through the device.

Upon the gripping and extraction of a cord and its plug or receptacle from conveyor B, the weight of the plug or receptacle and of the cord also disengages the cord from the adhesive 820 permitting the cord to fall into the appropriate bin. Brackets 852 and 853 are journalled at 802 and 803 for the shafts 804 and 805 of drums 806 and 807, the brackets preferably being fixed to uprights 100 or 101. A pulley 808 is attached to a shaft such as 805 and is driven by a belt 809 by a source of power not shown whereby the speed of conveyor E will equal that of conveyor B.

For convenience I shall describe the operation of my device in testing cords such as A having a plug 23 at one end and open terminals at the opposite end as shown in Fig. 1 to Fig. 4.

The endless conveyors B and E of my device are placed in operation, from any suitable source of power and as the slug-in receptacles C and M reach the end of the upper stretch thereof, the operator inserts each plug 23 of a cord such as A in a member C. Each strand 25 is thus electrically connected through prong 28 to strip 30 on the side 32 of a member C, and each strand 26 is electrically connected through prong 29 to strip 31 on the opposite side 33 of the member C. It should be noted however, that since the free terminals 21 and 22 of strands 25, 26 do not touch, there is no circuit through the cord A unless it is short circuited. Conveyor B, revolving in the direction of the arrows shown in Fig. 1, moves member C with its depending cord A, between tracks 42 and 43, at the first station.

If the cord A is short circuited, a primary electric circuit will be completed which includes the source of electromotive force 500, wire 501, track 43, member C, cord A, track 42, wire 502, solenoid coil 503 and wire 505. This circuit, by energizing coil 503, causes solenoid plunger 45 to advance jaw 47 against jaw 49 and clamp the cord A therebetween. The clamping of cord A between jaws 47 and 49 closes a circuit which includes a time delay relay 510. This circuit comprises the source of electromotive force 500, wire 501, wire 520, wire 720, relay 510, wire 506, wire 509, micro switch 85, wire 508, wire 507, relay 510, wire 721 and wire 505. The energization of time delay relay 510, after a suitable time interval such as ½ second to allow any cord vibration to stop, results in the closing of a circuit which includes the source of electromotive force 500, wires 501, 520, relay 510, wires 521 and 522, solenoid coils 60 and 160 and wire 505, thus energizing coils 60 and 160.

The energization of coils 60 and 160 causes the solenoid plungers, or rods 70 and 71 to be drawn downwardly, thus lowering the vertically movable support 46 against the tension of springs S, and also lowering movable support 50 because of the clamping action of my cord clamping mechanism.

The cord A clamped between jaws 47 and 49 is thus pulled downwardly extracting its plug 23 from its member C which opens the circuit between tracks 42 and 43 and permits a spring such as J to return plunger 45 and jaw 47 to their original positions. The unclamping of jaw 47 from jaw 49 opens the circuit to the relay 510 and to solenoid coils 60 and 160 thus permitting springs S to raise the movable supports 46 and 50 to their original positions.

If there is no short circuit in the cord A, no circuit is closed through track 42 and 43 and the member C, plug 23 and cord A simply pass the first station and enter the second station.

Upon entering the second station, the free terminals 21 and 22 of strands 25, 26 of cord A contact the electric conducting medium of low resistance 770 which may be a flat metal plate or the longitudinally extending trough 771 containing the electric conducting liquid 772. If there is a complete closed electric circuit from the free end of the cord A to and through the plug 23, a primary circuit is closed including strands 25 and 26, prongs 28, 29, and terminals 21 and 22 of cord A, strips 30, 31 of member C, tracks 92 and 93, wire 501, the source of electromotive force 500, wires 505 and 527, and solenoid coil 528.

Coil 528 is thus energized, and causes solenoid plunger 145 to advance head, or jaw 147 into clamping engagement with jaw 149 thus grasping the cord A therebetween. A circuit is thereby completed including the source of electromotive force 500, wire 501, wire 520, wire 720, relay 510, wire 506, wire 532, microswitch 185, wire 531, wire 507, relay 510, wire 721 and wire 505, thus energizing relay 510.

Relay 510, after a time interval, closes a circuit which includes the source of electromotive force 500, wires 501, 520, relay 510, wires 521 and 522, solenoid coils 60 and 160 and wire 505, thus energizing coils 60 and 160 and extracting the plug of the cord A from socket C in the manner explained above for the first station test.

In the event that a circuit does not exist through cord A, no circuit is completed through tracks 92 and 93 and the member C, plug 23 and cord A pass on the conveyor B to the third station.

Arm 701 is located in the path of the plug 23 of cord A, or in the path of some other portion thereof, and is moved against contact point 702 of switch 703, thus closing a circuit which includes switch 703, wire 501, source 500, wire 505, and solenoid coil 550 thus energizing coil 550. Coil 550 advances solenoid plunger 245 and thereby moves jaw 247 against jaw 249, thus clamping the cord A therebetween and closing a circuit including the source of electromotive force 500, wire 501, 520 and 720, time delay relay 510, wire 506, microswitch 285, wire 507, relay 510, wire 721 and wire 505, thus energizing the relay 510. Relay 510, after a time interval, closes a circuit which includes the source of electromotive force 500, wires 501 and 520, relay 510, wires 521, and 522, solenoid coils 60 and 160 and wire 505, thus energizing coils 60 and 160 and extracting the cord A and plug 23 from socket C on conveyor B in a manner similar to that at the first and second stations.

Cords extracted at the first station fall by gravity into bin 300, those extracted at the second station fall by gravity around trough 771 and into bin 301 and those extracted at the third station fall by gravity into bin 302.

It will be apparent that, if desired, the operator of my device can place the lower portion of a hanked cord such as A, in contact with an adhesive patch 820, on conveyor E at the same time that plug 23 is inserted in member C whereby the terminals 21 and 22 will be positively guided into engagement with the medium 770. However, as shown in Fig. 9, this operation is principally used when the cord clamping and disengaging mechanism has been raised above the bins to accommodate a straight cord such as W, in which case the cord can be looped and attached to belt E for passage through the device and will disengage from the adhesive 820, by its own weight, when the plug 23 is automatically extracted.

It will also be apparent that cords having a receptacle at one end, and open terminals at the other end, are placed on members M, rather than C, and follow the above described operation. Similarly, cords having a plug at the free end, rather than open terminals at that end, will be crossed by medium 770 and otherwise respond to the tests as does a cord such as A.

It should be understood that the structural details illustrated and described herein may be varied within considerable limits without exceeding the scope of my invention as defined in the following claims. For example the conveyor carrying the cords through the device can be arranged to follow an U-shaped path over the second station, thereby dipping the lower cord terminals into and out of the electric conducting bath. If desired, instead of a single bar such as 46 or 50 extending through all three stations a separate pair of bars at each station might be used.

I claim:

1. An apparatus for testing and assorting electric cords comprising an endless conveyor for continuously carrying cords individually and successively along a horizontal path, which path includes a first station, a second station and a third station, means spaced around said endless conveyor for slidably engaging one terminal end of a cord and electrically introducing the stranded conductors of the cord successively into first and second testing and assorting means; first testing and assorting means including card gripping and extracting jaws, at the first station, for electrically determining the existence of a short circuit in each cord and slidably disengaging short circuited cords from said conveyor means at said first station; second testing and assorting means including cord gripping and extracting jaws at the second station for electrically determining the existence of an open circuit in each cord and slidably disengaging cords, not having an open circuit, from said conveyor means at said second station and third assorting means including card gripping and extracting jaws at the third station for electrically responding to the arrival of a cord at said third station and slidably disengaging said cord from said conveyor means at said third station.

2. A device as specified in claim 1 wherein said first named means includes a pair of contact strips and said first and second testing and assorting means each include a pair of elongated contact tracks at their stations for electrically connecting with said strips while said strips are continuously advancing on said conveyor.

3. A device as specified in claim 1 wherein said second testing and assorting means includes means positioned at the second station for completing an electrical circuit through the other terminal end of each cord as said cord continuously advances on said conveyor.

4. A device as specified in claim 1 wherein the jaws of the first, second and third assorting means are each positioned on an opposite side of the path of said advancing cords and mounted to clamp an advancing cord therebetween, slidably extract a clamped cord from the conveyor and return to their original positions.

5. A device as specified in claim 1 plus second endless conveyor means for supporting the intermediate portions of said cords during their passage through said stations on said conveyor.

6. An apparatus for automatically testing insulation-covered, two strand electric cords, each cord having a slidable connecting element at one end and two spaced-apart terminals at the opposite end, said apparatus comprising the combination of a first endless conveyor having a plurality of members spaced therearound, each member adapted to slidably receive the cord connecting element of a cord; a second endless conveyor, parallel to and below said first conveyor, said second conveyor having a plurality of adhesive patches spaced therearound for engaging the lower portion of a cord depending from said first conveyor; mechanical means at a first conveyor station, responsive to an electric impulse induced by a short circuit through a cord, for slidably disengaging said cord from said first conveyor; mechanical means at a second conveyor station, responsive to an electric impulse induced by a circuit completely through a cord for slidably disengaging a cord from said first conveyor and mechanical means at a third conveyor station, responsive to an electric impulse induced by arrival of a cord at said third station for slidably disengaging a cord from said first conveyor.

7. A machine for automatically testing and assorting insulated wire cords, said machine including an endless conveyor having a stretch continuously advancing through at least three stations; a plurality of spaced plug-in receptacles carried by said conveyor, each for slidably receiving a cord plug, suspending the cord thereof below the conveyor and introducing the cord into an electrical testing circuit; cord gripping means including at least three pairs of electrically actuatable cord gripping jaws, each pair positioned on an opposite side of the path of a cord, at one of said stations, and at least one of said jaws being mounted to move into said path to clamp a cord upon receipt of an electric impulse from a testing circuit; cord extracting means, actuated by the closing of a pair of jaws on a cord, said cord extracting means being operably connected to each pair of jaws and mounted on said machine to move a closed pair of jaws away from the conveyor upon actuation; a first normally open electrical testing circuit including a source of current and means for receiving each plug-in receptacle into the circuit said first circuit electrically actuating the jaws at the first station upon being completed by a short circuited cord; a second normally open electrical testing circuit including a source of current and means for receiving each plug-in receptacle into the circuit, said second circuit electrically actuating the jaws at the second station upon being completed by a closed circuited cord, and a third circuit including a switch at the third station having a contact arm, in the path of a cord arriving at said station, said third circuit including a source of current and said switch and electrically actuating the jaws at said third station upon being completed by the closing of said contact arm.

8. A combination as specified in claim 7 wherein each plug-in receptacle includes a pair of spaced apart electric contact strips on the outside surface thereof, each conductively connected to one of the wire conductors of a cord in said receptacle and each electrical testing circuit includes a pair of similarly spaced apart conductive tracks, each fixed on said machine beside the path of one of the contact strips on said receptacles for temporarily connecting a cord into a testing circuit as the cord passes through a station.

9. A combination as specified in claim 7 wherein at least one of the jaws of each pair of jaws is actuated by a solenoid energized by one of said circuits.

10. A combination as specified in claim 7 wherein said cord extracting means includes a switch, movable to closed position by the closing of any of said pairs of jaws, said switch being included in a circuit which includes a source of current and a solenoid mounted on said machine to move said jaws in a direction away from said conveyor.

11. A combination as specified in claim 10 plus time delay means in the electric circuit of said cord extracting means for delaying extraction of a cord for a predetermined interval after the gripping of a cord by a pair of jaws.

12. A combination as specified in claim 7 wherein said second electrical testing circuit includes an electric conducting medium mounted on said machine at the second station and in the path of the free ends of cords suspended from said plug-in receptacles for completing said second circuit through the full length of a closed circuited cord at said second station.

13. An apparatus for automatically testing an insulation covered, two conductor electric cord, said apparatus including a continuously advancing conveyor; plug-in receptacles on said conveyor for slidably receiving one end of a cord and introducing the conductors thereof successively into testing circuits at stations spaced along the path of said receptacles; a first testing circuit including a source of current and a first solenoid at a first station on said conveyor; first cord gripping and extracting means at said first station, actuated by the energization of said first solenoid when a short circuited cord completes said first circuit; a second testing circuit including a source of current, a conductive liquid for electrically connecting the terminals at the other end of a cord and a second solenoid at a second station on said conveyor; second cord gripping and extracting means at said second station actuated by the energization of said second solenoid when a closed circuited cord completes said second circuit and a third circuit including a source of current, a switch closable by contact with a cord and a third solenoid at a third station on said conveyor and third cord gripping and extracting means at said third station actuated by the energization of said third solenoid when a cord closes said switch and completes said third circuit.

References Cited in the file of this patent

UNITED STATES PATENTS

| | | |
|---|---|---|
| 2,016,455 | Purdy | Oct. 8, 1935 |
| 2,020,964 | Reiter | Nov. 12, 1935 |
| 2,346,583 | Jackson | Apr. 11, 1944 |
| 2,417,488 | Handsforth et al. | Mar. 18, 1947 |
| 2,567,741 | Smith | Sept. 11, 1951 |
| 2,569,564 | Gulliet | Oct. 2, 1951 |
| 2,570,288 | Todd | Oct. 9, 1951 |
| 2,610,229 | Cranford | Sept. 9, 1952 |
| 2,628,999 | De Bruyne | Feb. 17, 1953 |